United States Patent [19]

Koike

[11] Patent Number: 4,622,658
[45] Date of Patent: Nov. 11, 1986

[54] SIMPLIFIED SOUND REPRODUCING DEVICE HAVING SWITCHABLE CIRCUITS

[75] Inventor: Eishi Koike, Sagamihara, Japan

[73] Assignee: Ozen Corporation, Japan

[21] Appl. No.: 494,421

[22] Filed: May 13, 1983

[30] Foreign Application Priority Data

Jan. 27, 1983 [JP] Japan .................................. 58-11729

[51] Int. Cl.$^4$ .......................... G11B 31/00; G11B 3/00
[52] U.S. Cl. ........................................ 369/31; 369/67; 369/63
[58] Field of Search ................ 360/79; 369/31, 63–64, 369/69–70, 65–67; 446/297–300, 309, 302, 303, 397, 404, 270; 272/14, 31 P

[56] References Cited

U.S. PATENT DOCUMENTS

| | | | |
|---|---|---|---|
| 3,589,735 | 6/1971 | Watanabe | 369/67 |
| 3,668,343 | 6/1972 | Raffaeli et al. | 369/70 |
| 3,823,946 | 7/1974 | Nakajima | 369/67 |
| 4,189,155 | 2/1980 | Ngai | 369/63 |

Primary Examiner—Raymond F. Cardillo
Assistant Examiner—Robert A. Weinhardt
Attorney, Agent, or Firm—Basile, Weintraub & Hanlon

[57] ABSTRACT

A sound reproducing device for use in dolls, toys and the like includes first and second movable contacts and a fixed contact mounted within a casing. The second movable contact normally engages the fixed contact to complete a first circuit between a power source, a first motor, the second movable contact and the fixed contact to energize the first motor to rotate a record disc. The first movable contact is engaged by the tone arm of the sound reproducing device when the tone arm reaches the end point of sound reproduction and is urged into contact with the second movable contact moving the second movable contact out of contact with the fixed contact disconnecting the first circuit and completing a second circuit between the first and second movable contacts, the power source and a second motor for energizing the second motor to drive the doll, toy or the like.

2 Claims, 3 Drawing Figures

SIMPLIFIED SOUND REPRODUCING DEVICE HAVING SWITCHABLE CIRCUITS

BACKGROUND OF THE INVENTION

1. Field Of The Invention

This invention relates to a simplified sound reproducing device and, more particularly, to a sound reproducing device comprising a switching means which allows, upon completion of a sound reproduction, the starting of a second motor for actuating another motion to be played by another component.

2. Description Of The Prior Art

Various kinds of simplified sound reproducing device have already been provided which can reproduce the recorded item or items by rotating a record disc by a motor. However, they perform the mere function of reproducing sounds recorded on the record disc.

In many cases, simplified sound reproducing device of this kind are incorporated into dolls or toys. Accordingly, there have arisen demands or desires to have such devices perform sound reproduction in connection with the motion of such dolls or toys.

This invention aims to satisfy the above mentioned demands or desires.

Accordingly, an object of the present invention is to provide a change-over means incorporated in a simplified sound reproducing device which enables automatic change-over of the driving means, upon completion of a sound reproduction, from its rotation of the turn table to the subsequent driving of another component.

Another object of the present invention is to provide a simple and exact means for resetting the device which can readily be incorporated in a simplified sound reproducing device for re-starting a sound reproduction.

SUMMARY OF THE INVENTION

According to the simplified sound reproducing device of the present invention, a first movable contact is disposed at the end point of sound reproduction such that the movable contact can be urged and retained by a tone arm when it has reached the end point of sound reproduction. Moreover, the device also includes a fixed contact and a second movable contact which continues engagement with the fixed contact only until the time when the tone arm arrives at the end point of sound reproduction, with its free end being extended upto the end point of sound reproduction, but in such a manner that it does not contact the first movable contact until said time.

By virtue of this construction, a switching means is provided in which an electric circuit is established. The circuit includes a first motor for driving a record disc, a fixed contact, a second movable contact, a power source, such that, upon arrival of the tone arm at the end point of sound reproduction, the device is automatically changed over to drive any external means or devices. The present invention is also provided with a push actuator of a simplified construction which returns the tone arm to the starting point of sound reproduction.

According to the present invention, the switching means to be incorporated in the simplified sound reproducing device comprises a first movable contact, the free end of which extends up to the end point of sound reproduction. The first movable contact is placed in the swing plane of a pickup, formed as a part of and at the forward tip end of a tone arm, and is urged and retained by the pickup at the end point of sound reproduction. A second movable contact which is kept in contact with the fixed contact until the pickup arrives at the end point of sound reproduction. The second movable contact is configured such that its forward free end extends up to the end point of sound reproduction in the swing plane of said pickup, in such a manner that it does not come into contact with the first movable contact. The second movable contact is urged by the pickup, upon its arrival at the end point of sound reproduction, away from the engagement with said fixed contact so as to be brought into contact with the first movable contact to complete a first electric circuit for energizing a second motor for driving a doll or a toy connected in parallel to the power source.

A second electric circuit includes in order: the first movable contact, the second movable contact, the power source and the second motor.

Accordingly, upon completion of each playing, the device is automatically changed over into the next step of silent or gestured movement played by a doll or toy in connection with previously reproduced sounds or voices, thus bringing about attractive performance of a device of this kind.

In this present invention, a slidably operable push actuator is adopted for returning the tip end of the tone arm, namely, a pickup, to the starting point of sound reproduction.

The push actuator comprises a projection having an inclined face which urges and lifts the speaker unit upwards against the downward force imparted by a stylus pressure spring and an integrally formed mounting post attached to the casing. The push actuator has such spring properties that the push actuator can be returned to its original non-actuating position when it is released from the operator's pushing action. Accordingly, the construction of the actuator for returning the pickup to the starting point has been simplified which can contribute to the simplification of the device as a whole.

DETAILED DESCRIPTION OF THE PREFERRED EMBODIMENT

Figure 1:
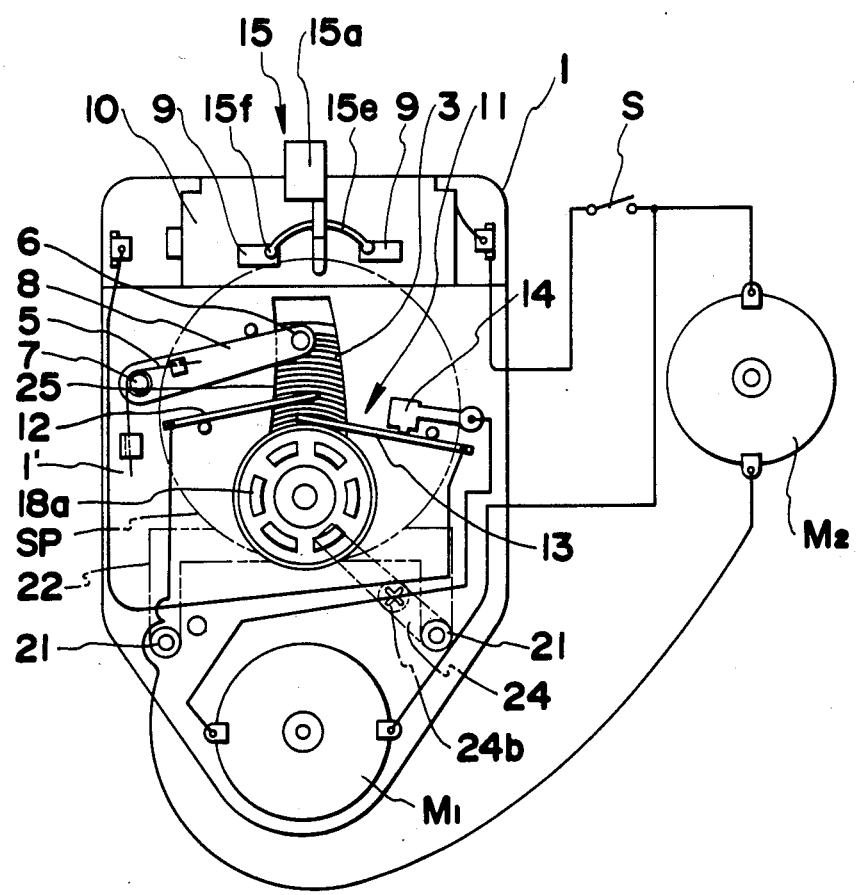
FIG. 1 is a plan view of the sound reproducing device of the present invention, with the housing of the casing having been removed.

In FIG. 1, numeral 1' is an upper deck of the chassis and numeral 10 is a battery magazine. A first motor Ml is fixedly attached on the upper face of the upper deck 1' opposite to the portion where the battery magazine 10 is disposed. The first motor M1 is used as a driving motor for rotating a record disc described hereafter.

On the upper deck 1' and between the portion where the battery magazine 10 the first motor M1 is attached, a tone arm 8 is swingably attached around a pin 7.

Figure 2:
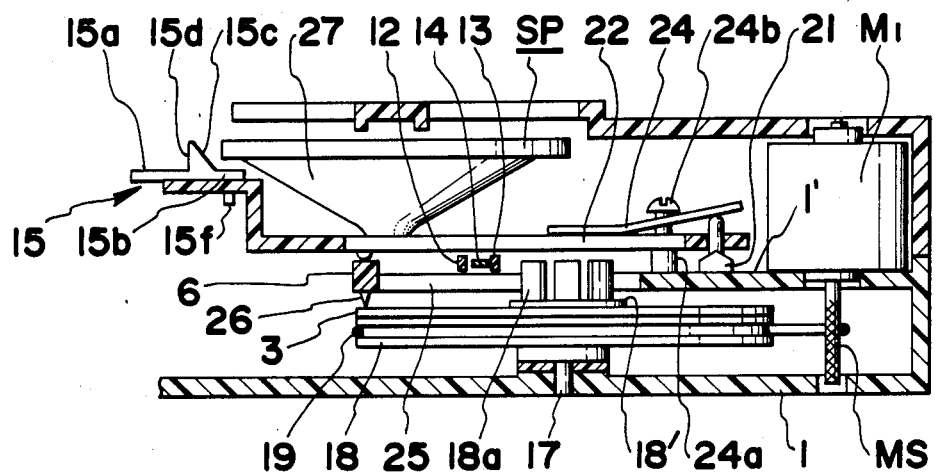
FIG. 2 is a cross sectional, elevational view of the device shown in FIG. 1.

As shown in detail, in FIG. 2, a record disc 3 is tightly laid on a turn table 18 rotatably received around a center pin 17 which is disposed upstanding toward the interior of the casing 1 from the upper face of the bottom plate of the chassis of the casing 1. The peripheral side face of the turn table 18 is formed to constitute a pulley groove. A belt 19 fabricated of resilient material extends between the output shaft MS of the first motor M1 and the turn table 18. Further, at the center of the boss 18′, there are provided a plurality of resilient holding teeth 18a far attaching the record disc 3 to the turntable 18. As shown in FIG. 2, a boss 18′ is integrally formed at the center of the turn table 18 so as to fix and hold the record disc 3 thereon. A stylus pressure spring 24 fabricated as a leaf spring is attached by means of a set screw 24b onto a mounting post 24a formed on the upper deck 1′. The forward portion of the leaf spring 24 contacts the speaker unit SP and resiliently urges the speaker unit SP toward the recorded face of the record disc 3. The opposed portion of leaf spring 24 is supported by a pair of holding posts 21.

A wide aperture 25 is formed along the swing path of the pickup 6 of the tone arm 8, the central part of which adjacent to the center of the record disc 3 is widened to form a round opening through which the holding teeth 18a pass and extend beyond the upper face of the upper deck 1′.

The upper face of the pickup 6 of the tone arm 8 slidably engages the lower face of a sound transmitting member 22. By virtue of this construction, a sound reproducing stylus 26 of the pickup 6 is resiliently urged by the spring force of the stylus pressure spring 24 against the upper face of the record disc 3. Accordingly, the pickup 6 slidably contacts and supports a part of the speaker unit SP at a portion apart from the holding posts 21 so that a necessary stylus force can be imparted to the pickup 6.

Now, an explanation will be provided of the switching means 11 which effects switching the actuation of the first motor M1 to a second motor M2. The switching means 11 consists of a first movable contact 12, a second movable contact 13 and a fixed contact 14.

The second movable contact 13 is biased by its own spring property to normally contact the fixed contact 14 until the pickup 6 reaches the end point of sound reproduction. In this position, the switching means 11 constitutes a first circuit for actuating the first motor M1. In addition, the first movable contact 12 and the second movable contact 13 are fabricated of a resilient material such that each of the two movable contacts 12 and 13 can display a resilient biasing force directed to the required direction.

The first movable contact 12 is kept out of contact with the second movable contact 13 until the time when the pickup 6 has arrived at the end point of sound reproduction. Upon arrival of the tone arm 8 carrying pickup 6 at the end point of sound reproduction, the first movable contact 12 is urged and held by the tone arm 8 so as to be placed in contact with the second movable contact 13, which is concurrently urged out of engagement with the fixed contact 14 to thereby to complete a second circuit for actuating the secondmotor M2 and de-actuating the first motor M1. In this way, arrival of the tone arm 8 at the end point of sound reproduction stops the rotation of the motor M1, and in turn, the record disc 3.

A push actuator 15 is disposed at the peripheral side end of the upper deck 1′, opposite from the portion where the motor M1 is mounted push actuator 15 is disposed. The push actuator 15 is formed of a molded plastic piece having a plurality of integrally formed portions consisting of a flat pusher plate 15a projecting outside the casing 1, a pusher rod 15b, a proJection 15d having an inclined face 15c facing toward the interior of the casing 1 and a pair of circularly bifurcated fixing legs 15e. Each of the legs 15e further comprises an integrally formed mounting post 15f projecting downward at a right angle from the tip end of the fixing leg 15e. The push actuator 15 is attached on the battery magazine 10 which is a part of the upper deck 1′, by inserting each of the mounting posts 15f into each of a pair of oblong apertures 9 formed on the battery magazine 10 such that the inclined face 15c, when pushed, can abut the lower face of the flange of the speaker unit SP.

If the pusher plate 15a of the push actuator 15 is urged toward the interior of the casing 1, the inclined face 15c of the projection 15d will contact the speaker unit SP raise it upward along the inclined face 15c by a further pushing of the pusher plate 15a. Thus, the stylus pressure imparted on the sound reproducing stylus 26 is released which allows the tone arm 8 to retract to the starting point of sound reproduction of the record disc 3.

Concurrent with the aforesaid returning of the tone arm 8, both the first movable contact 12 and the second movable contact 13 return to their original positions, in which the second movable contact 13 engages the fixed contact 14 to close the first circuit for actuating rotation of the record disc 3.

Subsequent releasing of the pushing of the push actuator 15 allows the push actuator 15 itself to return to its original, non-actuated position by virtue of its inherent spring property, and thus releases the inclined face 15c from its upward supporting for the speaker unit SP so as to allow it move downward until it can impart a necessary stylus pressure to the speaker unit SP. This results in engagement of the sound reproducing stylus 26 with the record groove to the end point of the sound reproduction where the first motor M1 is to be stopped as mentioned above.

Since the second motor M2 is generally used to actuate a doll or a toy into which the sound reproducing device of the present invention is incorporated so as to enable it to make a desired motion, such as to swing its arm or feet or to walk, the second motor M2 is not usually housed in the chassis of the sound reproducing device, but is connected by leads to one pole of the switch S and to the first movable contact 12. As soon as the pickup 6 reaches the end point of sound reproduction, the first movable contact 12 engages the second movable contact 13 under the urging and holding action of the pickup 6. This further causes the second movable contact 13 to move away from the fixed contact 14 and closes the circuit for energizing the second motor M2.

Figure 3:
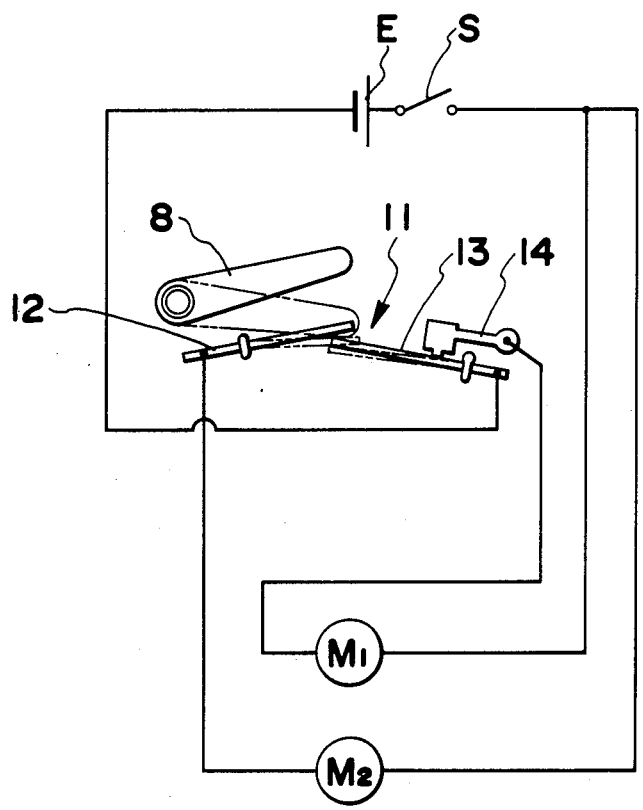
FIG. 3 is a schematic circuit diagram of the present invention.

Now, explanation will be made on, by referring to FIG. 3 on the electric circuit of the present invention. On pole of the power source E, such as a battery, is connected, through the switch S, in parallel to the first motor M1 and to the second motor M2. The other pole of the power source E is connected to the base of the second movable contact 13, which is further connected to the first motor M1, when the second movable contact 13 engages the fixed contact 14.

Prior to the time when the pickup 6 reaches the end point of sound reproduction, a circuit is completed through the power source E, the second movable contact 13, the fixed contact 14 and the first motor M1.

The forward tip end of the second movable contact 13 extends upto the end point of sound reproduction on the swing plane of the pickup 6, so that, upon arrival of the pickup 6 at the point of sound reproduction, the pickup 6 urges and supports the first movable contact 12 in engagement with the second movable contact 13. In this state, a circuit is established which includes the power source E, the second movable contact 12, the first movable contact 13 and the second motor M2.

The operation of the device of this invention will now be explained. In FIG. 3, the switch S is shown open, and thus, both the first and the second circuits are not electrically connected so that the motor M1 and motor M2 are stopped. Closing of the switch S completes a circuit through the power source E, the first motor M1, the fixed contact 14 and the second movable contact 13 for energizing the first motor M1 to rotate the record disc 3 for performing sound reproduction by the pickup 6.

When the pickup 6 has reached the end point of sound reproduction, it contacts the first movable contact 12 and a further advancing of the pickup 6 on the record disc 3 urges the first movable contact 12 from the fixed contact 14 and into engagement with the second movable contact 13. As the result of this connection, there is no current flowing through the first circuit for the motor M1 thereby stopping the first motor M1. In this way, the record disc 3 stops rotation and the tone arm 8 is also stopped at its end position.

At this moment, however, the circuit for the second motor M2 is closed through power source E, the second motor M2, the first movable contact 12 and the second movable contact 13. By this circuit connection, the second motor M2 starts rotation and acts to move the arms or legs of the toy or the doll coupled to the sound reproducing device.

When it is necessary to reset the motor M1 for the next playing, pushing forward of the push actuator 15 will return pickup 6 to the starting point of sound reproduction. This also allows the first movable contact 12 to move away from the second movable contact 13 by virtue of the spring property of the switch 12 itself. At the same time, the second movable contact 13 also moves due to its inherent spring property to contact the fixed contact 14. In this way, the first motor M1 is also energized to rotate the first motor M1, and in turn, the record disc 3. The next releasing of the forward pushing of the push actuator 15 results in engagement of the reproducing stylus with the recorded groove of the record disc 3.

What is claimed is:

1. An improved simplified sound reproducing device for use in or with a doll, toy or the like comprising:
    a casing;
    a record disc housed in the casing and having at least one recorded groove formed thereon with starting and end points of sound reproduction;
    first motor for rotating the record disc;
    a tone arm adapted to travel from the starting point to the end point of sound reproduction along the recorded groove of the record disc;
    return spring means for biasing the tone arm to the starting point of sound reproduction on the recorded groove;
    a pickup mounted on the tone arm;
    a speaker unit including a speaker and a sound transmitting member, the speaker unit being slidably engaged by the pickup;
    a second motor for driving the doll, toy or the like;
    a power source;
    a switching circuit including:
    a first movable contact mounted in the casing apart and distinct from the tone arm and pickup, the first movable contact extending to the end point of sound reproduction on the recorded groove on the record disc in the swing plane of the pickup, the first movable contact being movable between a first normal position and a second position upon pivotal engagement by the tone arm;
    a fixed contact mounted in the casing; and
    a second movable contact mounted in the casing and movable between a first normal position contacting the fixed contact and a second position out of contact with the fixed contact and contacting the first contact when the first movable contact is engaged by the tone arm and pickup;
    the second movable contact when contacting the fixed contact completes a first electrical circuit between the power source, the first motor, the second movable contact and the fixed contact for driving the first motor to rotate the record disc; and where
    the pickup engages the first movable contact when it reaches the end point of sound reproduction on the recorded groove of the record disc and urges the first movable contact to the second position engaging the second movable contact and urging the second movable contact to its second position out of contact with the fixed contact to complete a second electrical circuit between the power source, the second motor, the first movable contact and the second movable contact to energize the second motor for driving the doll, toy or the like.

2. The improved simplified sound reproducing device as claimed in claim 1 further comprising:
    a stylus pressure spring imparting stylus pressure on the speaker unit; and
    a push actuator mounted in the casing,
    the push actuator having an integral projection with an inclined face engagable with the speaker unit when the push actuator is actuated for urging the speaker unit against the stylus pressure imparted by the stylus pressure spring;
    the push actuator being resiliently mounted in the casing so as to return to its non-actuated original position when the push actuator is released from actuation.

* * * * *